United States Patent
Kwon et al.

(10) Patent No.: US 7,550,217 B2
(45) Date of Patent: Jun. 23, 2009

(54) STACK SUPPORTED SOLID OXIDE FUEL CELL

(75) Inventors: Oh-Hun Kwon, Westborough, MA (US); William J. Donahue, Holliston, MA (US); Marc Abouaf, Harvard, MA (US); Christophe Coureau, Marlboro, MA (US); F. Michael Mahoney, Holliston, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 10/864,285

(22) Filed: Jun. 9, 2004

(65) Prior Publication Data

US 2005/0019636 A1 Jan. 27, 2005

Related U.S. Application Data

(60) Provisional application No. 60/477,149, filed on Jun. 9, 2003.

(51) Int. Cl.
*H01M 8/12* (2006.01)
*H01M 4/86* (2006.01)

(52) U.S. Cl. .......................................... 429/31; 429/32

(58) Field of Classification Search ............. 429/30–33, 429/40
See application file for complete search history.

(56) References Cited

U.S. PATENT DOCUMENTS

| | | | |
|---|---|---|---|
| 3,404,040 A * | 10/1968 | Mitoff et al. ............... | 429/34 |
| 4,000,006 A | 12/1976 | Trocciola et al. | |
| 4,421,787 A | 12/1983 | Ikezawa et al. | |
| 4,505,992 A | 3/1985 | Dettling et al. | |
| 4,605,602 A | 8/1986 | Feigenbaum et al. | |
| 4,732,637 A | 3/1988 | Dettling et al. | |
| 4,799,936 A | 1/1989 | Riley | |
| 4,851,304 A | 7/1989 | Miwa et al. | |
| 4,997,726 A | 3/1991 | Akiyama et al. | |
| 5,034,288 A | 7/1991 | Bossel | |
| 5,069,987 A | 12/1991 | Gordon | |
| 5,186,877 A | 2/1993 | Watanabe | |
| 5,292,599 A | 3/1994 | Soma et al. | |
| 5,486,428 A | 1/1996 | Gardner et al. | |
| 5,508,127 A | 4/1996 | Lewin et al. | |
| 5,531,019 A | 7/1996 | Taira et al. | |
| 5,551,955 A | 9/1996 | Taira et al. | |
| 5,554,454 A | 9/1996 | Gardner et al. | |

(Continued)

FOREIGN PATENT DOCUMENTS

DE 4307967 9/1994

(Continued)

OTHER PUBLICATIONS

Sarin, V., et al., "Development of Hot Pressing as a Low Cost Processing Technique for Fuel Cell Fabrication", Final Annual Technical Progress Report, Jan. 6, 2003, Dept. of Manufacturing Engineering, Boston University, 44 pgs.

*Primary Examiner*—Gregg Cantelmo
(74) *Attorney, Agent, or Firm*—Larson Newman Abel & Polansky, LLP

(57) ABSTRACT

The disclosure is directed to a solid oxide fuel cell stack. The solid oxide fuel cell stack includes at least two solid oxide fuel cells. The two solid oxide fuel cells share a common electrode.

9 Claims, 14 Drawing Sheets

U.S. PATENT DOCUMENTS

| | | | |
|---|---|---|---|
| 5,595,833 A | | 1/1997 | Gardner et al. |
| 5,601,937 A | * | 2/1997 | Isenberg ..................... 429/17 |
| 5,686,197 A | | 11/1997 | Nishida et al. |
| 5,753,385 A | | 5/1998 | Jankowski et al. |
| 5,786,105 A | * | 7/1998 | Matsushima et al. .......... 429/34 |
| 5,827,620 A | | 10/1998 | Kendall |
| 5,869,201 A | | 2/1999 | Marchetti |
| 5,885,729 A | | 3/1999 | Marchetti |
| 5,902,691 A | * | 5/1999 | Matzkin-Bridger .......... 429/12 |
| 5,922,486 A | | 7/1999 | Chiao |
| 5,942,349 A | * | 8/1999 | Badwal et al. ................. 429/34 |
| 5,993,986 A | | 11/1999 | Wallin et al. |
| 6,025,084 A | * | 2/2000 | Kawasaki et al. ............. 429/30 |
| 6,093,500 A | * | 7/2000 | Margiott et al. ............... 429/13 |
| 6,099,985 A | | 8/2000 | Elangovan et al. |
| 6,117,302 A | | 9/2000 | Roha |
| 6,228,520 B1 | | 5/2001 | Chiao |
| 6,280,484 B1 | | 8/2001 | Kelder et al. |
| 6,309,769 B1 | | 10/2001 | Haug |
| 6,316,138 B1 | | 11/2001 | Satake et al. |
| 6,399,233 B1 | | 6/2002 | Milliken et al. |
| 6,428,920 B1 | | 8/2002 | Badding et al. |
| 6,436,565 B1 | | 8/2002 | Song et al. |
| 6,485,852 B1 | | 11/2002 | Miller et al. |
| 6,551,734 B1 | | 4/2003 | Simpkins et al. |
| 6,551,735 B2 | | 4/2003 | Badding et al. |
| 6,593,020 B1 | | 7/2003 | Yoo et al. |
| 6,649,296 B1 | | 11/2003 | Minh |
| 6,653,009 B2 | * | 11/2003 | Wang et al. ................... 429/30 |
| 6,677,070 B2 | | 1/2004 | Kearl |
| 6,682,842 B1 | | 1/2004 | Visco et al. |
| 6,783,880 B2 | | 8/2004 | Christiansen |
| 6,790,474 B1 | | 9/2004 | Hishinuma et al. |
| 6,803,141 B2 | | 10/2004 | Pham et al. |
| 6,822,193 B2 | | 11/2004 | Olsen et al. |
| 6,835,485 B2 | | 12/2004 | Ukai et al. |
| 6,846,511 B2 | | 1/2005 | Visco et al. |
| 6,855,451 B2 | | 2/2005 | Ghosh et al. |
| 6,864,009 B2 | | 3/2005 | Yoo et al. |
| 6,896,989 B2 | | 5/2005 | Hara et al. |
| 6,949,307 B2 | | 9/2005 | Cable et al. |
| 2002/0142210 A1 | | 10/2002 | Kaiser et al. |
| 2002/0150805 A1 | * | 10/2002 | Stenersen et al. ............. 429/34 |
| 2002/0155227 A1 | | 10/2002 | Damani et al. |
| 2002/0155335 A1 | * | 10/2002 | Kearl .......................... 429/30 |
| 2003/0077496 A1 | | 4/2003 | Keegan et al. |
| 2004/0121217 A1 | * | 6/2004 | Herman et al. ................ 429/38 |
| 2004/0247971 A1 | | 12/2004 | Sarin et al. |
| 2006/0057295 A1 | | 3/2006 | Visco et al. |
| 2006/0153974 A1 | | 7/2006 | Matsuzaki et al. |

FOREIGN PATENT DOCUMENTS

| | | | |
|---|---|---|---|
| EP | 0 552 055 A2 | | 7/1993 |
| EP | 1 624 521 | | 2/2006 |
| JP | 63-43263 | | 2/1988 |
| JP | 09045356 A | * | 2/1997 |
| KR | 20020069338 | | 8/2002 |
| RU | 2129323 | | 4/1999 |
| RU | 2197039 | | 1/2003 |
| WO | WO 2001148855 A1 | * | 7/2001 |
| WO | WO 03/034515 A2 | | 4/2003 |
| WO | WO 2005/027239 | | 3/2005 |

* cited by examiner

STACK SUPPORTED SOLID OXIDE FUEL CELL

CROSS-REFERENCE TO RELATED APPLICATION(S)

The present application claims priority from U.S. provisional patent application No. 60/477,149, filed Jun. 9, 2003, entitled "STACK SUPPORTED SOLID OXIDE FUEL CELL," naming inventors Oh-Hun Kwon, William J. Donahue, Marc Abouaf, and Christophe Coureau, which application is incorporated by reference herein in its entirety.

FIELD OF THE DISCLOSURE

The present invention generally relates to solid oxide fuel cells (SOFCs), and in particular commercially viable SOFCs and methods for manufacture.

BACKGROUND

Solid oxide fuel cells (SOFCs) are an alternative to traditional combustion engines and turbines for producing energy. Fuel cell technologies may produce electricity with greater efficiency and lower environmental impact and fuel cell technologies generally have lower CO, NOx, and SOx emissions. Solid oxide fuel cells may use natural gas, kerosene, and diesel fuels, among others, as fuel sources. However many typical SOFCs suffer from high costs per unit power output.

Solid oxide fuel cells may be manufactured in several forms, including tubular and planar SOFCs. Each of these forms uses a support structure. Tubular SOFCs typically use a strontium oxide doped lanthanum manganite (LSM) porous support tube. Planar SOFCs may utilize an electrolyte-supported structure or an electrode-supported structure. The electrolyte-supported structure is typically formed of yttria-stabilized zirconia having a high thickness. These thick electrolytes have a high ionic resistance, which results in a reduced cell potential.

Electrode-supported SOFCs may be formed with the cathode or the anode supporting the structure. Cathodes, such as lanthanum strontium manganite (LSM), have coefficients of thermal expansion close to yttria-stabilized zirconia. On the other hand, anode-supported cells are generally formed with nickel and yttria-stabilized zirconia. The coefficient of thermal expansion of the nickel containing yttria-stabilized zirconia is greater than that of the yttria-stabilized zirconia electrolyte. In both the cathode-supported and anode-supported cells, large electrode thickness affects the diffusion of reactants and the resistance of the electrode. In either case of electrode or electrolyte supported cells, the effect of the thick electrolyte or electrode reduces the cell potential or current density, adversely affecting efficiency of the SOFC system.

In addition to the support structure concerns, challenges exist with coupling electrical contacts to electrodes. Typical SOFCs have gas impermeable interconnects. The typical interconnect has a thermal expansion coefficient dissimilar to that of the electrode. Coefficient of thermal expansion differences cause interconnects to shear from the electrode, causing an increase in resistance in the cell. Some interconnect materials diffuse into the electrode structure. Poor construction of interconnects leads to reductions in operational potential and current density.

As such, typical solid oxide fuel cell technologies suffer from deficiencies in structure and manufacturing that increased the cost of energy produced. Accordingly there is a need for improved electrodes, electrolytes, SOFCs, and SOFC stacks.

SUMMARY

In one particular embodiment, the disclosure is directed to a solid oxide fuel cell stack. The solid oxide fuel cell stack includes at least two solid oxide fuel cells. The two solid oxide fuel cells share a common electrode.

In another embodiment, the disclosure is directed to a solid oxide fuel cell stack. The solid oxide fuel cell stack comprises integrated layers. The layers include a first anode layer, a first electrolyte layer, a first cathode layer, a second electrolyte layer, and a second anode layer. The first electrolyte layer overlies the first anode layer. The first cathode layer overlies the first electrolyte layer. The second electrolyte layer overlies the first cathode layer and the second anode layer overlies the second electrolyte layer.

In a further embodiment, the disclosure is directed to a solid oxide fuel cell stack. The solid oxide fuel cell stack includes at least two solid oxide fuel cells. The solid oxide fuel cells are free of a gas impermeable interconnect layer.

In another embodiment, the disclosure is directed to a method of forming a solid oxide fuel cell. The method includes forming a solid oxide fuel cell including a cathode layer, an anode layer, and an electrolyte layer provided between the anode layer and the cathode layer; and densifying the solid oxide fuel cell in an oxidizing environment.

In a further embodiment, the disclosure is directed to a solid oxide fuel cell including an anode layer comprising integrated microchannels; an electrolyte layer overlying the anode layer; and a cathode layer comprising integrated microchannels. The cathode overlies the electrolyte layer.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

According to one embodiment, the invention is directed to a solid oxide fuel cell stack. The stack includes two or more solid oxide fuel cells (SOFCs). Two of the cells share a common electrode layer. The electrodes may include microchannels and be electrically connected externally to the solid oxide fuel cell stack in the form of a circuit, which may be parallel, in series, or a hybrid series/parallel circuit. The particular structure of the foregoing embodiment utilizing a common electrode lends itself to parallel circuit formation.

Figure 1:
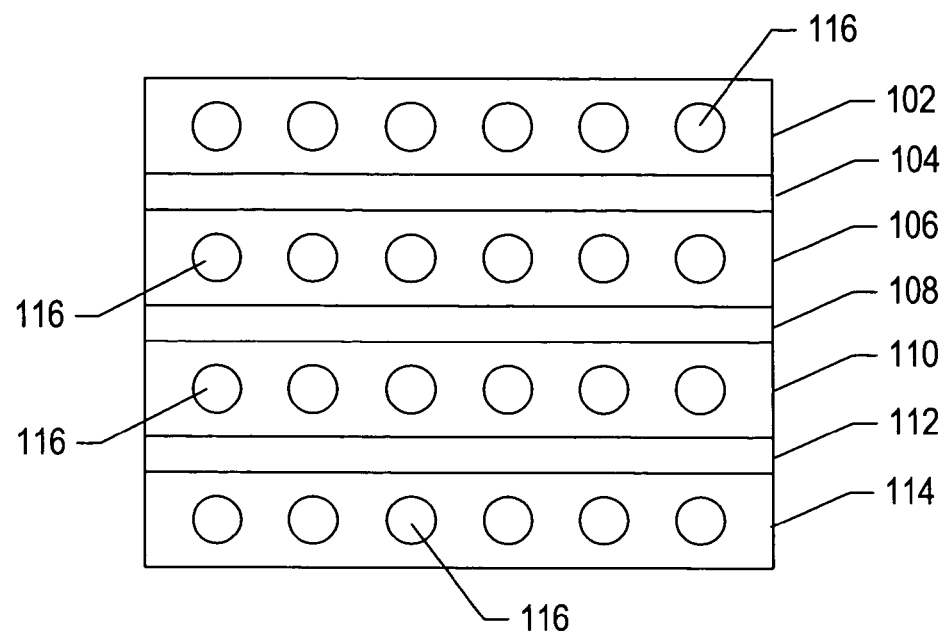
FIG. 1 depicts an exemplary solid oxide fuel cell stack.

FIG. 1 illustrates an exemplary embodiment of a solid oxide fuel cell stack. The stack includes electrode layers 102, 106, 110 and 114 separated by electrolyte layers 104, 108 and 112. Each electrode layer may include microchannels 116. Depending upon the type of electrode, an oxidizer or fuel flows through microchannels 116 and ions are transported across the electrolytes 104, 108 and 112.

In one particular embodiment, electrode 102 is an anode and electrode 106 is a cathode. Anode 102 and cathode 106 are separated by an electrolyte 104 to form a single solid oxide fuel cell. Oxygen ions can be transported across electrolyte 104 to react with the fuel causing an electrical potential difference between anode 102 and cathode 106. Cathode 106 is separated from an anode 110 by an electrolyte 108. Here too, oxygen ions may be transported across electrolyte 108 to cause a potential between cathode 106 and anode 110. Similarly, anode 110 is separated from a cathode 114 by another electrolyte 112. The pattern may be repeated multiple times.

In this exemplary embodiment, the solid oxide fuel cells share common electrodes. These electrodes may have a single composition throughout or have varying layers and gradients resulting in the electrode functionality. In the case of electrode 106, the common electrode structure is a cathode. In the case of electrode 110, the common electrode structure is an anode. The stack may be arranged in a repeating pattern so that several electrodes are shared among adjacent solid oxide fuel cells. This configuration removes reliance upon use of gas-impermeable interconnect barriers.

However, the stack may alternatively be formed with gas impermeable interconnects. In this configuration, the arrangement of cells lends to a series circuit configuration of a solid oxide fuel cell stack. The stack may be connected to other stacks in a series, parallel or hybrid series/parallel circuit configuration.

Figure 8:
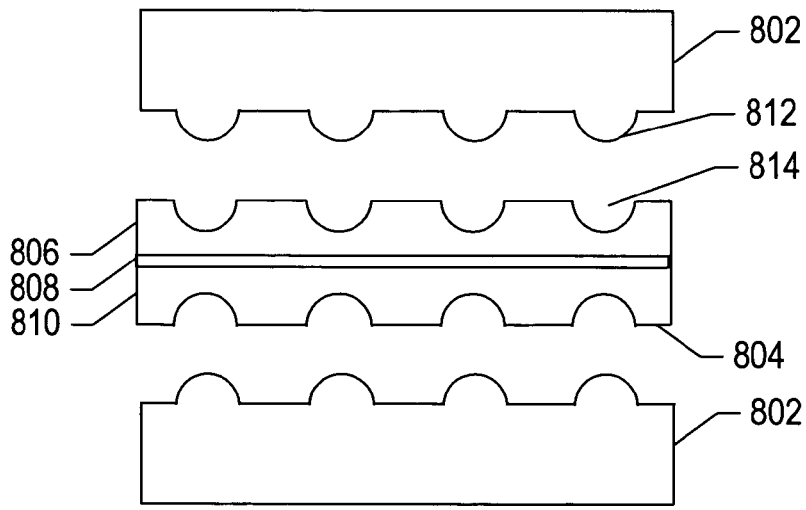
FIG. 8 depicts an exemplary apparatus for forming gas channels.
Figure 15:
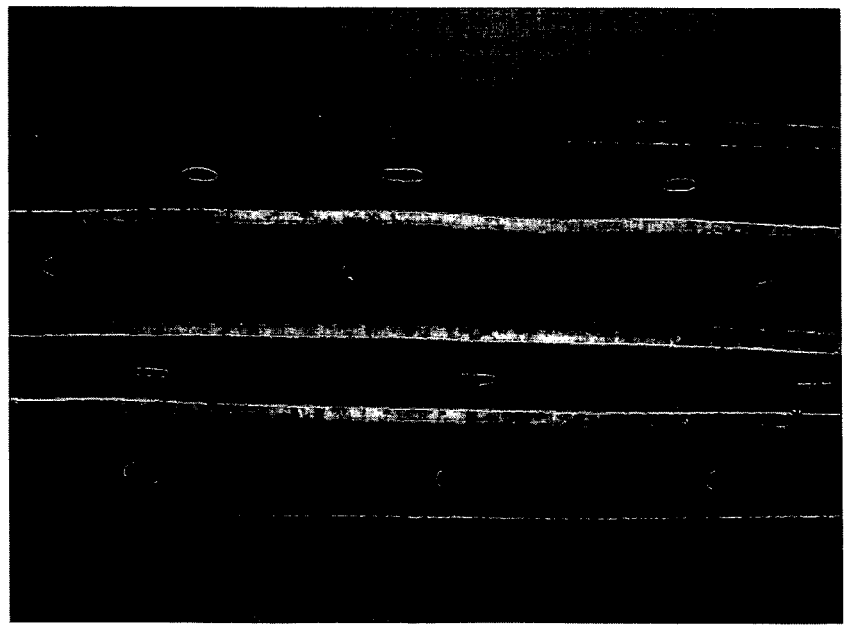
FIG. 15 depicts an exemplary solid oxide fuel cell stack.

The exemplary embodiment may also include microchannels 116 as shown in each of the electrodes 102, 106, 110 and 114. These microchannels may have a characteristic diameter of between 0.1 mm and 5 mm. The microchannels are generally less than about 3 mm, such as less than about 1 mm. The characteristic diameter is associated with fluid flow arts. The microchannels may be integrated into the electrodes. In the exemplary embodiment shown in FIG. 1, the microchannels are embedded in the electrodes 102, 106, 110, and 114. Exemplary microchannels are illustrated in FIG. 15. In other exemplary embodiments, the microchannels may be fully or partially embedded in the electrodes or may be formed as part of the geometric contour of the electrode layers. Another example of the microchannels is shown in FIG. 8, discussed below.

The microchannels may be formed through a subtractive process such as the dissolution of a filler material or the oxidation of a channel former. The channel former may, for example, be a carbon-based channel former such as amorphous carbon, carbon black, graphite, or graphite-resin composite. The microchannels 116 permit the flow of an oxidizer or fuel depending upon the function of the electrode structure in which they are formed.

The electrodes may also be porous. In some exemplary embodiments, pores may be formed through reduction of a metal oxide. In another example, the pores may be formed through a subtractive process such as dissolution of a filler material or the oxidation of a pore former. The pore former may include a carbon-based material such as carbon black, amorphous carbon, graphite, or graphite-resin composite. Pores may also be formed by a partial densification by control of relative particle and agglomeration-size distribution.

Figure 2:
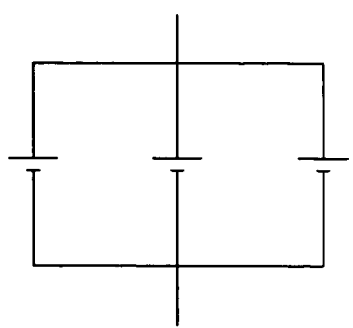
FIG. 2 depicts an exemplary circuit achieved through the electrical connection to the solid oxide fuel cell stack of FIG. 1.

The electrodes may also include an integrated current collector. The integrated current collector may be embedded in the electrode and formed in conjunction with the formation of the electrode and may include a conductor such as nickel. The current collector may guide electrical current to or from one or more external contacts depending upon the type of electrode. In alternative embodiments, the electrodes may not include current collectors and external connections may be made directly to electrodes. If the outputs of cathodes are coupled and the outputs of anodes are coupled, the circuit results in a parallel circuit structure as exhibited in FIG. 2.

The solid oxide fuel cell stack may be formed through an integrated heating process. For example, individual cells, and in one particular embodiment, the stack as a whole may be densified by sintering. While sintering generally includes pressureless sintering, pressure-sintering is often preferred, such as hot pressing, hot isostatic pressing (HIP), and hot forging. In some embodiments, HIP is avoided for cost reasons. Of the sintering options that utilize an applied pressure, hot pressing is used in one particular embodiment and hot forging in another particular embodiment. While both hot pressing and hot forging are generally unidirectional or uniaxial, hot forging generally includes substantial hot deformation, such as to fill into a complex die cavity. Lower pressures associated with hot pressing rather than hot forging are generally preferred to prevent diametral shrinkage. The pressures and temperatures may be manipulated such that the cycle of the heat treatment has a cycle period of not greater than about 60 minutes. Alternatively the cycle may be manipulated to have a time of not greater than about 45 minutes, 30 minutes, 15 minutes, or 10 minutes.

With the integral processing of the cells or the stack, SOFCs may be formed with a cell thickness not greater than about 10 millimeters, such as not greater than about 5 millimeters. Alternate embodiments may include SOFCs with cell thickness of not greater than 4 millimeters or 3 millimeters. Furthermore, the processing may result in solid oxide fuel cell stacks having electrolyte thickness of less than 100 micrometers and electrode thickness of at most about 3 mm. However, cells of greater thickness may be optionally formed through integral processing.

The electrolyte may be formed from various materials including zirconia, ceria, gallia, and other known ionic conductors. Oxygen ion conductivity is enhanced with materials such as yttrium, scandium, samarium, ytterbium and gadolinium. For example, the electrolyte may be formed from yttria-stabilized zirconia, scandia-doped zirconia, ytterbia-doped zirconia, samarium oxide-doped ceria, gadolinium oxide-doped ceria, or calcia-doped ceria, among others. In conjunction with the electrolyte, the anode may be formed with a nickel and yttria-stabilized zirconia or nickel and gadolinium oxide-stabilized ceria. The nickel is generally produced through the reduction of nickel oxide included in the green anode or preprocessed anode. The cathode may be formed from lanthanum strontium manganite when used in conjunction with an yttria-stabilized zirconia. Alternately, the cathode may comprise lanthanum strontium ferrite or lanthanum strontium cobalt ferrite, among others.

Figure 3:
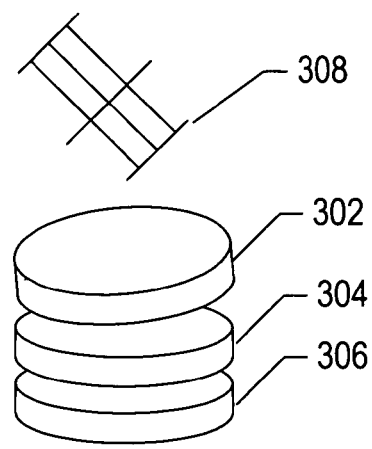
FIG. 3 depicts an exemplary solid oxide fuel cell.

FIG. 3 depicts an exemplary embodiment of a solid oxide fuel cell. The SOFC is shown having an electrolyte 304 adjacent to an anode 302 on one side and a cathode 306 on another side. A mesh 308 is shown to be associated with the anode 302. However, the mesh may be incorporated into various electrode structures to enhance the mechanical integrity of cells and stack or to improve connections to outside current collectors.

The layers 302, 304 and 306 may be formed using various low-cost manufacturing approaches. These manufacturing approaches may include tape-casting, screen-printing, tape-calendaring, multilayer ceramics processing, thermal spray coating, lithographic deposition, extrusion and coating, and co-extrusion. The thus formed cell may be sintered, such as by pressureless sintering, or preferably, by pressure sintering such as hot pressing, hot forging, or hot isostatic pressing. The cell may be incorporated into a stack that is sintered utilizing the foregoing techniques to form an integrated structure.

The anode 302 may be formed using a combination of nickel oxide and yttria-stabilized zirconia or gadolinium oxide-stabilized ceria. The mesh 308 may be a metal mesh such as a nickel mesh and the mesh 308 may be embedded in the electrode. The electrolyte 304 may be formed from zirconia or ceria, among others. The electrolyte material may be stabilized with a stabilizer such as oxides of yttrium, scandium, samarium, ytterbium or gadolinium. For example, the electrolyte may be formed from yttria-stabilized zirconia, scandia-doped zirconia, ytterbia-doped zirconia, samarium oxide-doped ceria, or gadolinium oxide-doped ceria. In one exemplary embodiment, yttria-stabilized zirconia has yttria in amounts greater than about 8 mol %, such as at least about 8.5 mol % or at least about 9 mol %. For example, yttria-stabilized zirconia having about 10-mole percent yttria may be used. The cathode may be formed from lanthanum strontium manganite, lanthanum strontium ferrite or lanthanum strontium cobalt ferrite.

Figure 4:
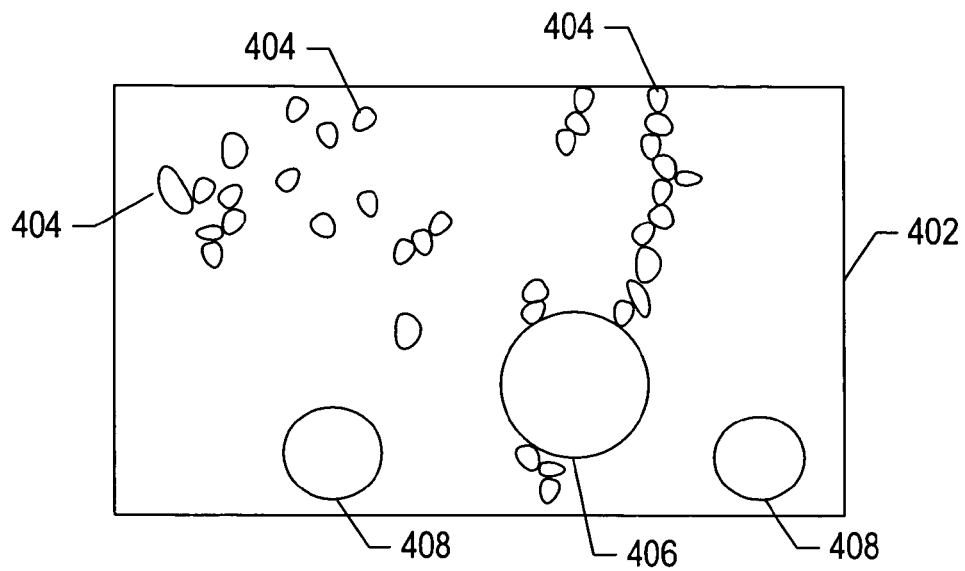
FIG. 4 illustrates the formation of an exemplary electrode.

Gas transport within the electrodes may be facilitated through the formation of pores and microchannels. FIG. 4 depicts the inclusion of pore former 404 and channel former 406 in an electrode 402. The electrode 402 may also include a current-collecting mesh depicted as 408. The channel former 406 and pore former 404 may be removed from the electrode through a subtractive process such as oxidation to leave channels and pores. For example, 50% of the channel forming and pore forming material may be removed, such as by oxidation. In other examples, greater than 80%, 90%, or 95% of the channel formers and pore formers may be removed. In another exemplary embodiment, the channel former and pore former may be substantially removed such that the resulting electrode 402 comprises less than 5 wt. % of the channel former or pore former. For example, the electrode 402 may comprise less than 3 wt. %, 1 wt. %, or 0.5 wt. % of the channel former or pore former.

Figure 5A:
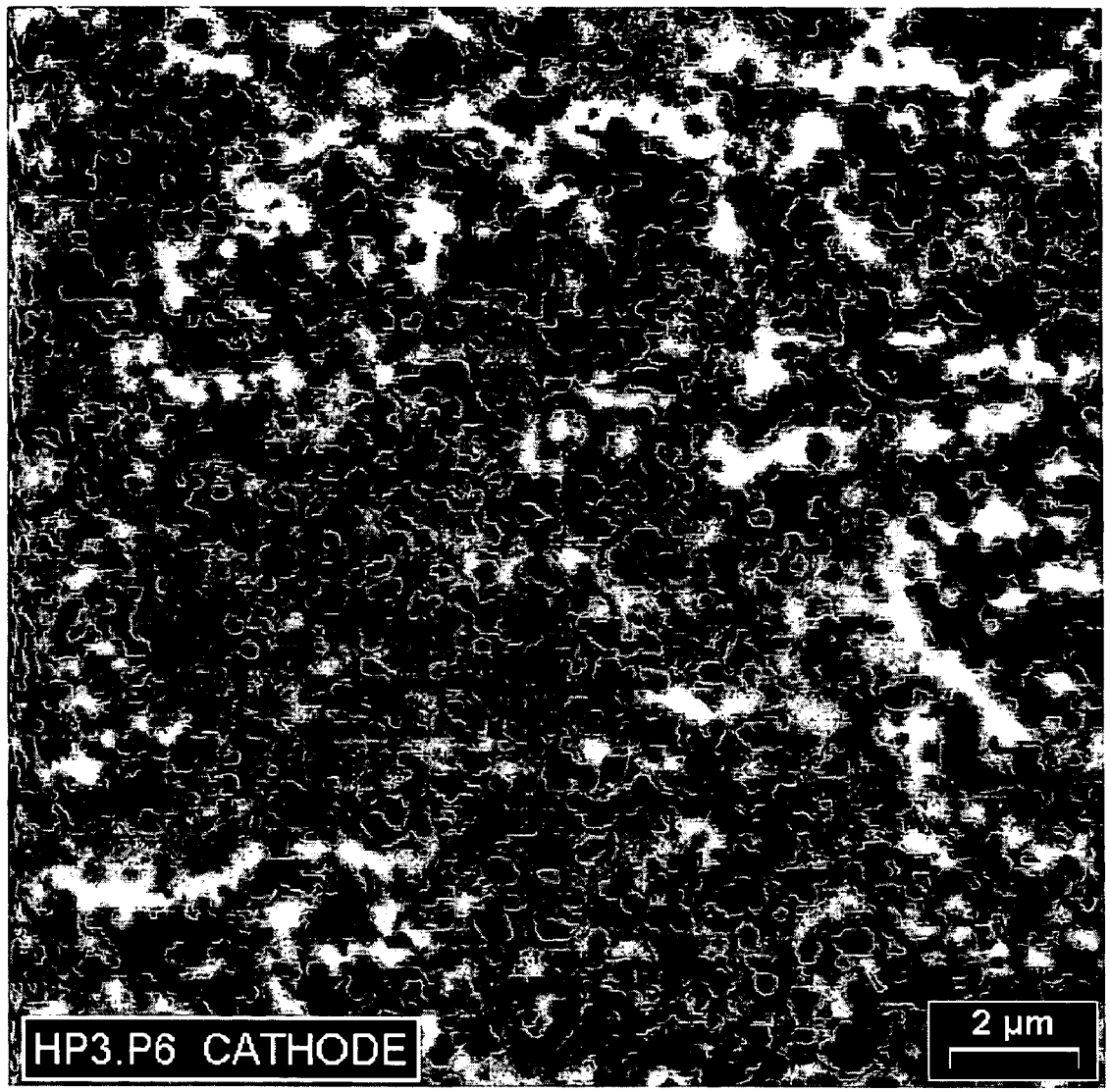
FIGS. 5-A, 5-B, 6-A, 6-B, 7-A, 7-B, 7-C and 7-D depict the formation of exemplary electrodes.
Figure 5B:
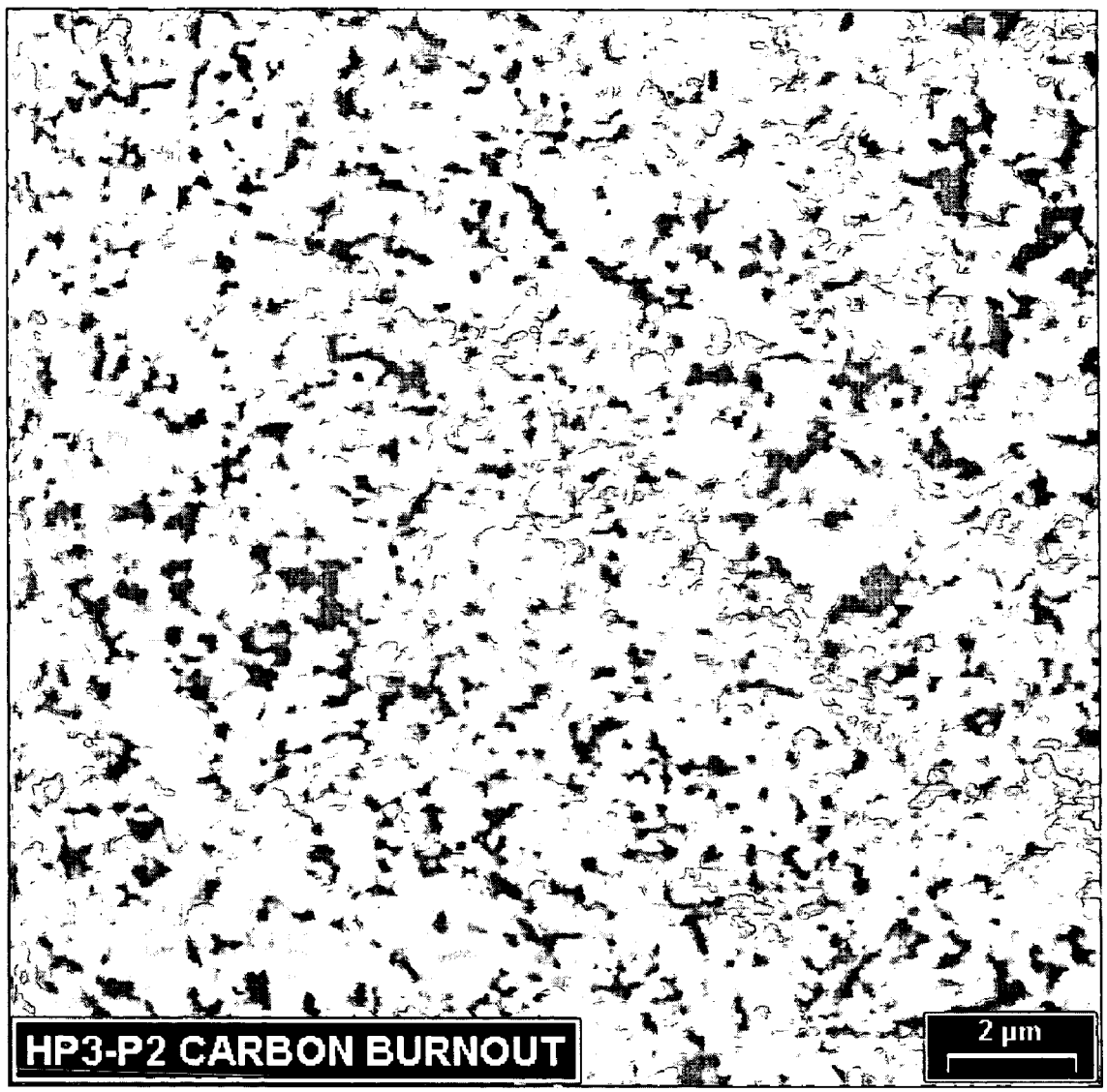

FIG. 5-A depicts an exemplary cathode with a pore former following a hot pressing cycle under a reducing atmosphere. In this exemplary embodiment, the cathode includes lanthanum strontium manganite milled to 11.4 meters$^2$ per gram, which is wet-mixed with yttria-stabilized zirconia and carbon black to approximately 15.8 wt. % or 40 vol. % carbon black. FIG. 5-B depicts the electrode after heat treatment in air at 900° C. for 10 hours. This exemplary cathode has a 30% open porosity.

Figure 6A:
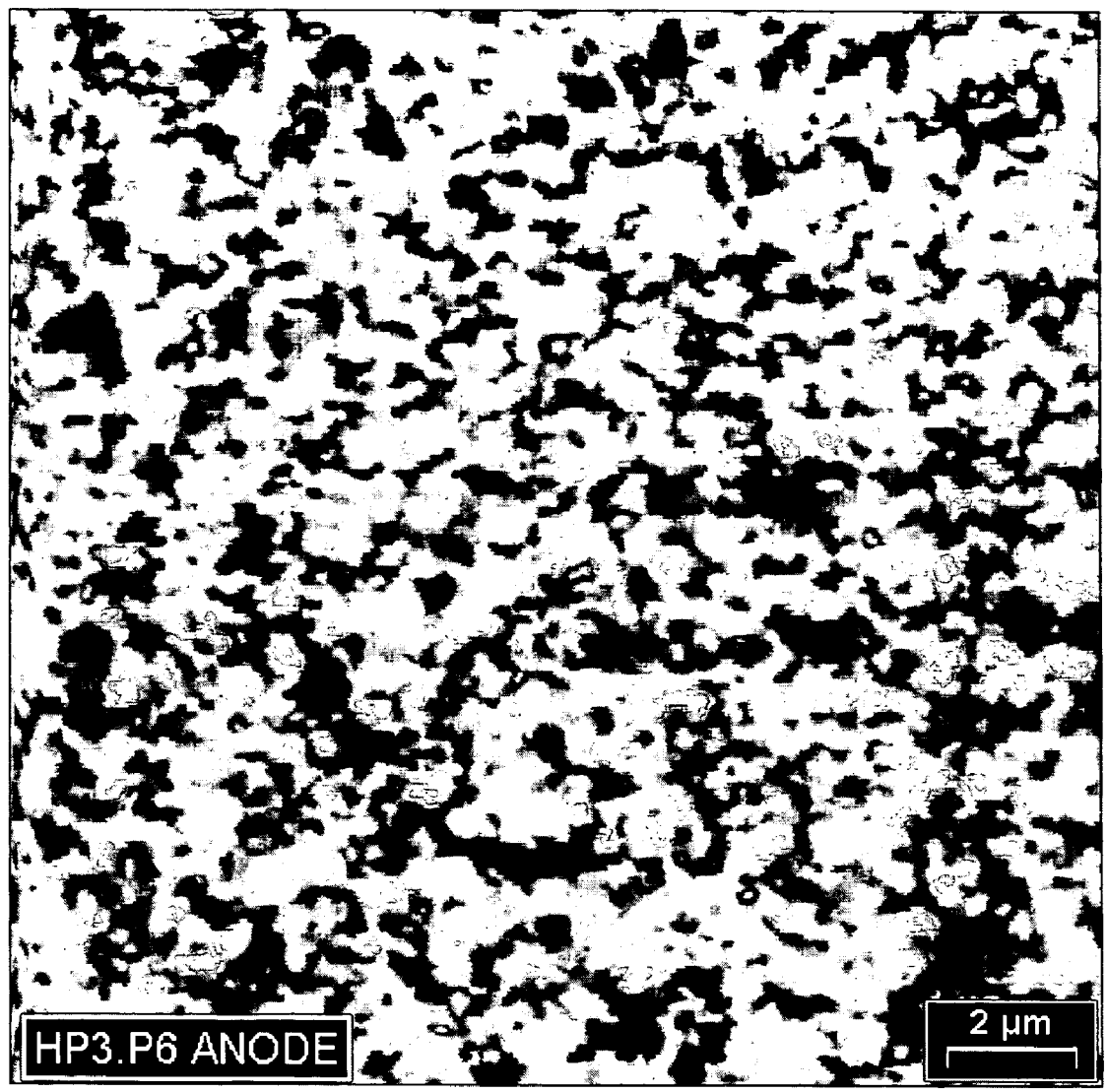
Figure 6B:
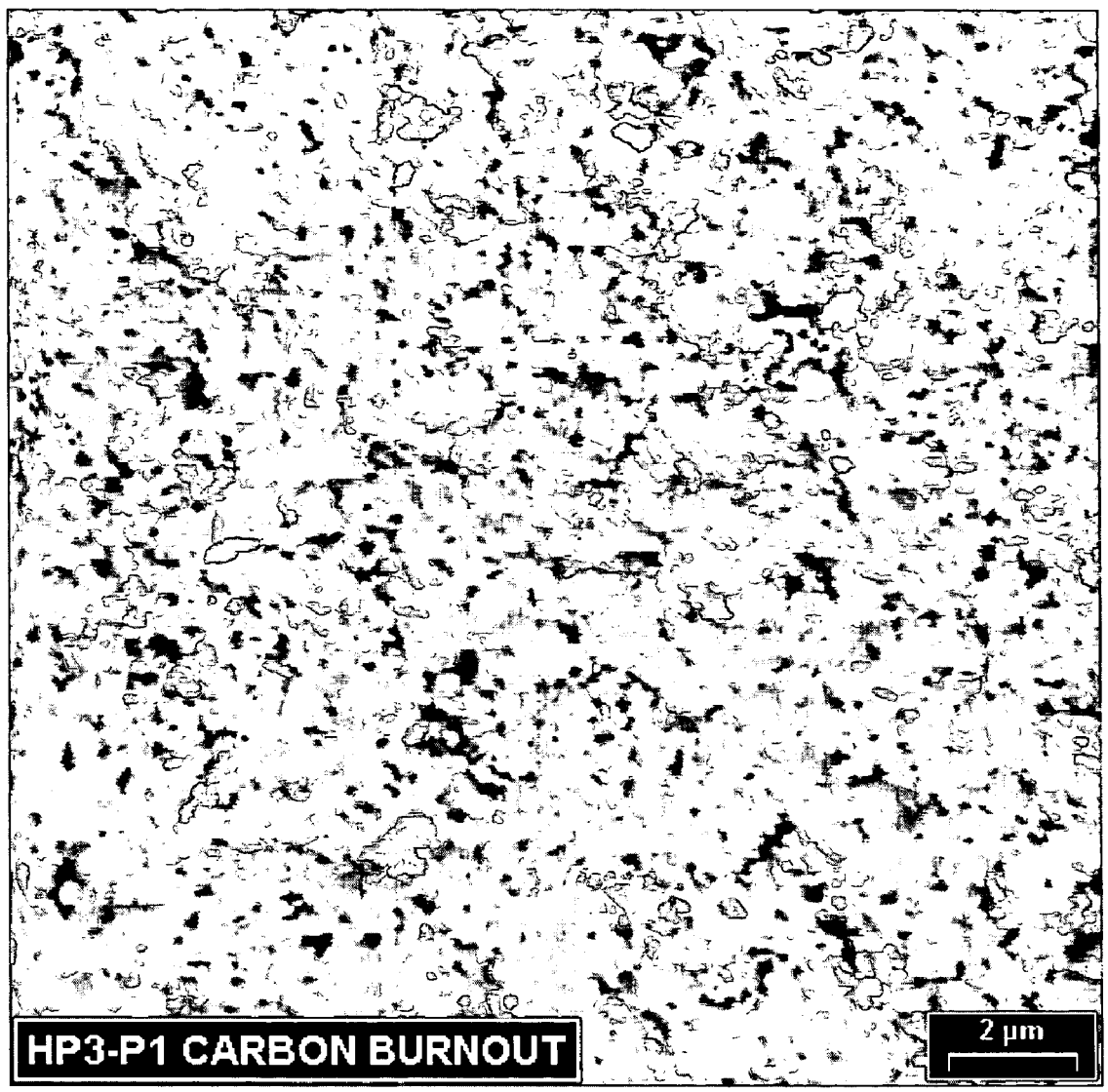
Figure 7A:
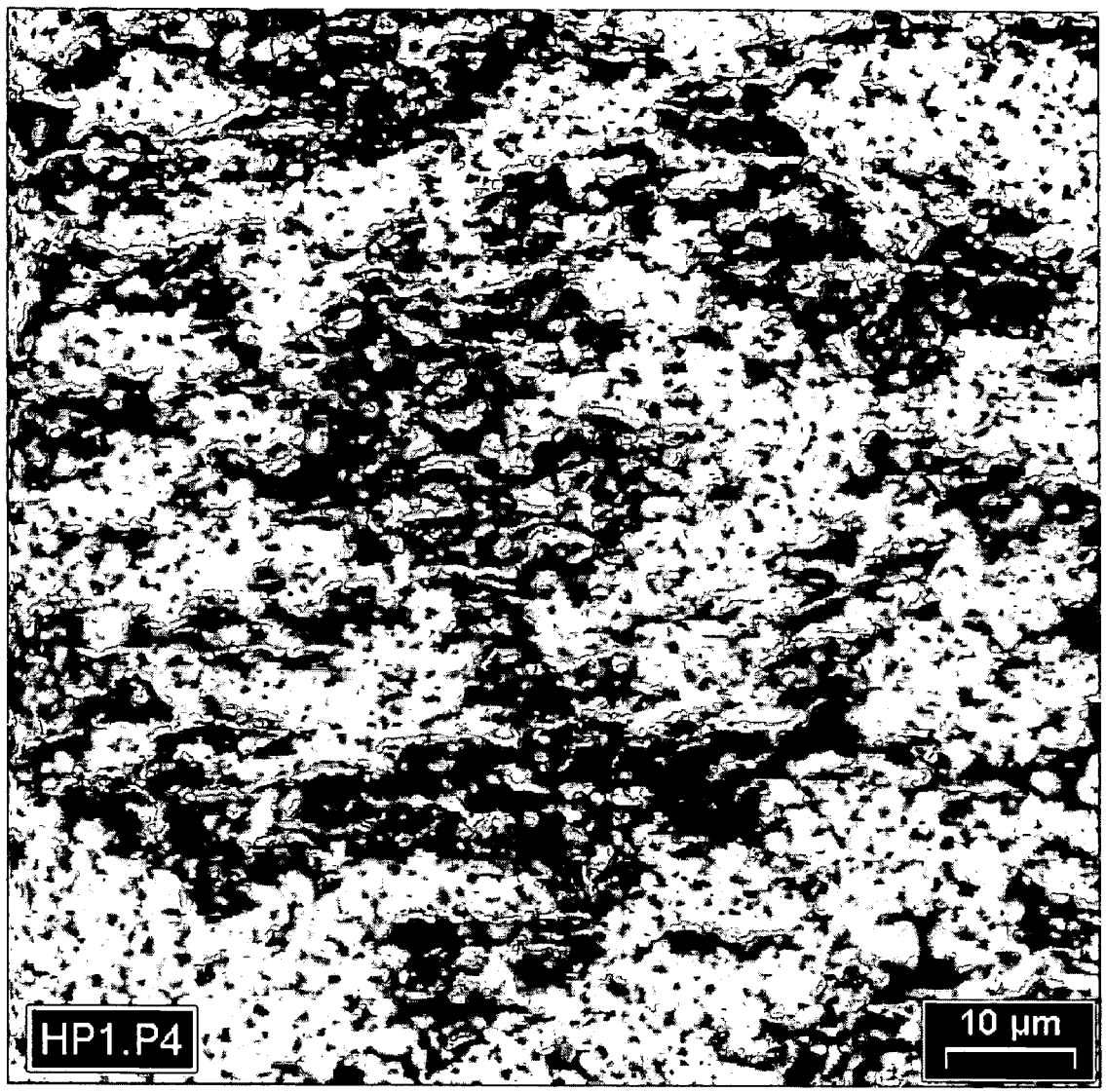
Figure 7B:
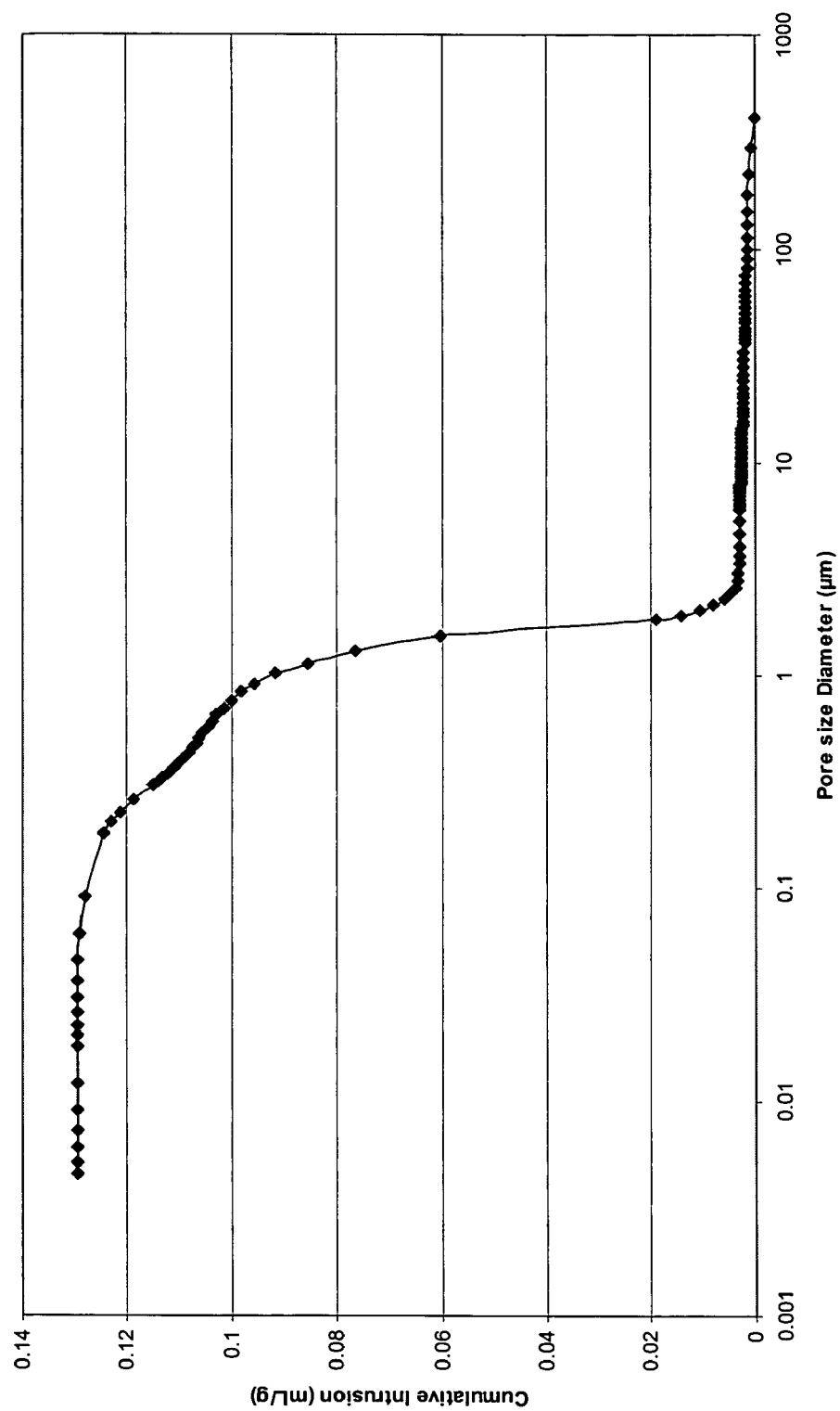
Figure 7C:
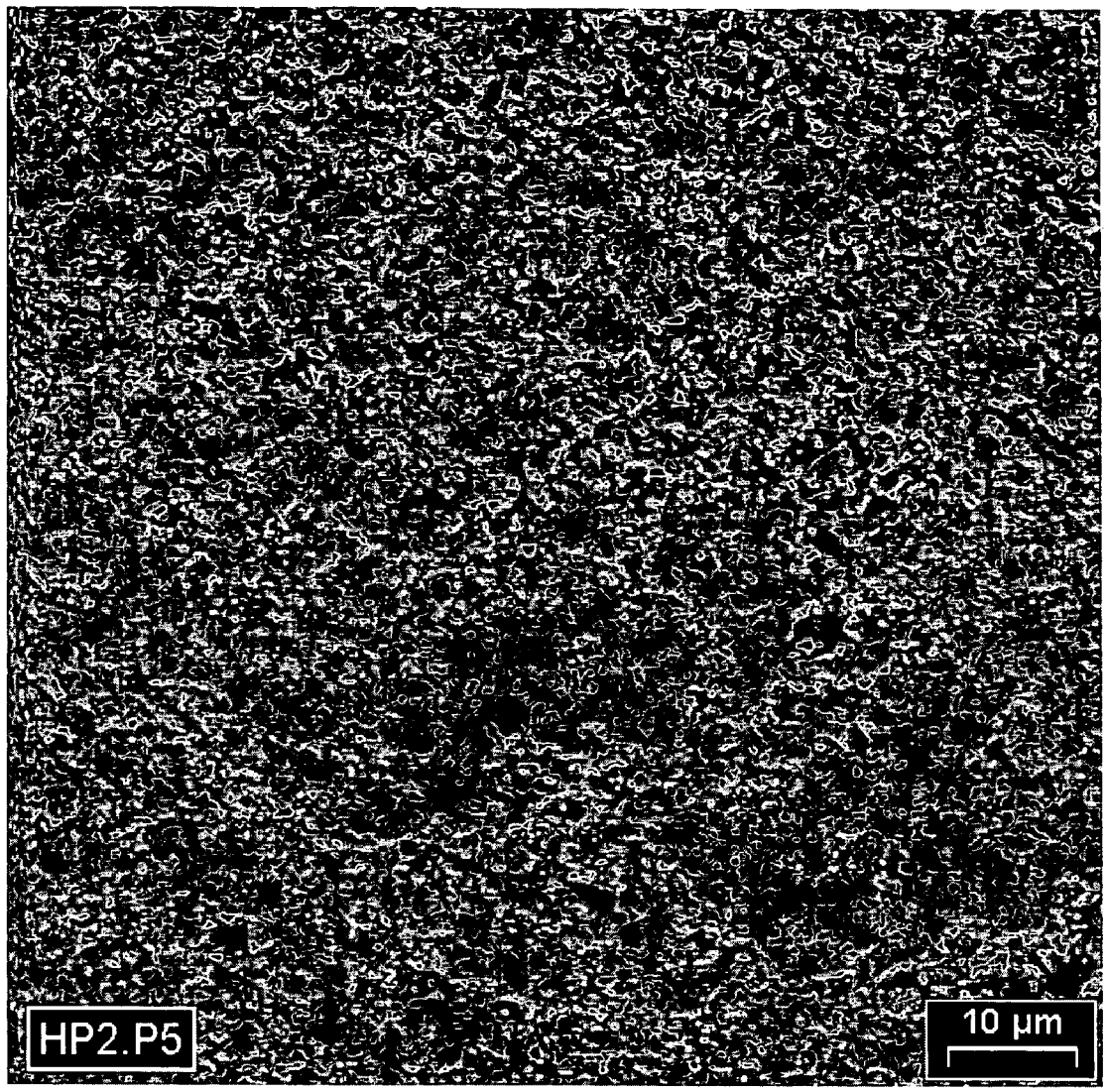
Figure 7D:
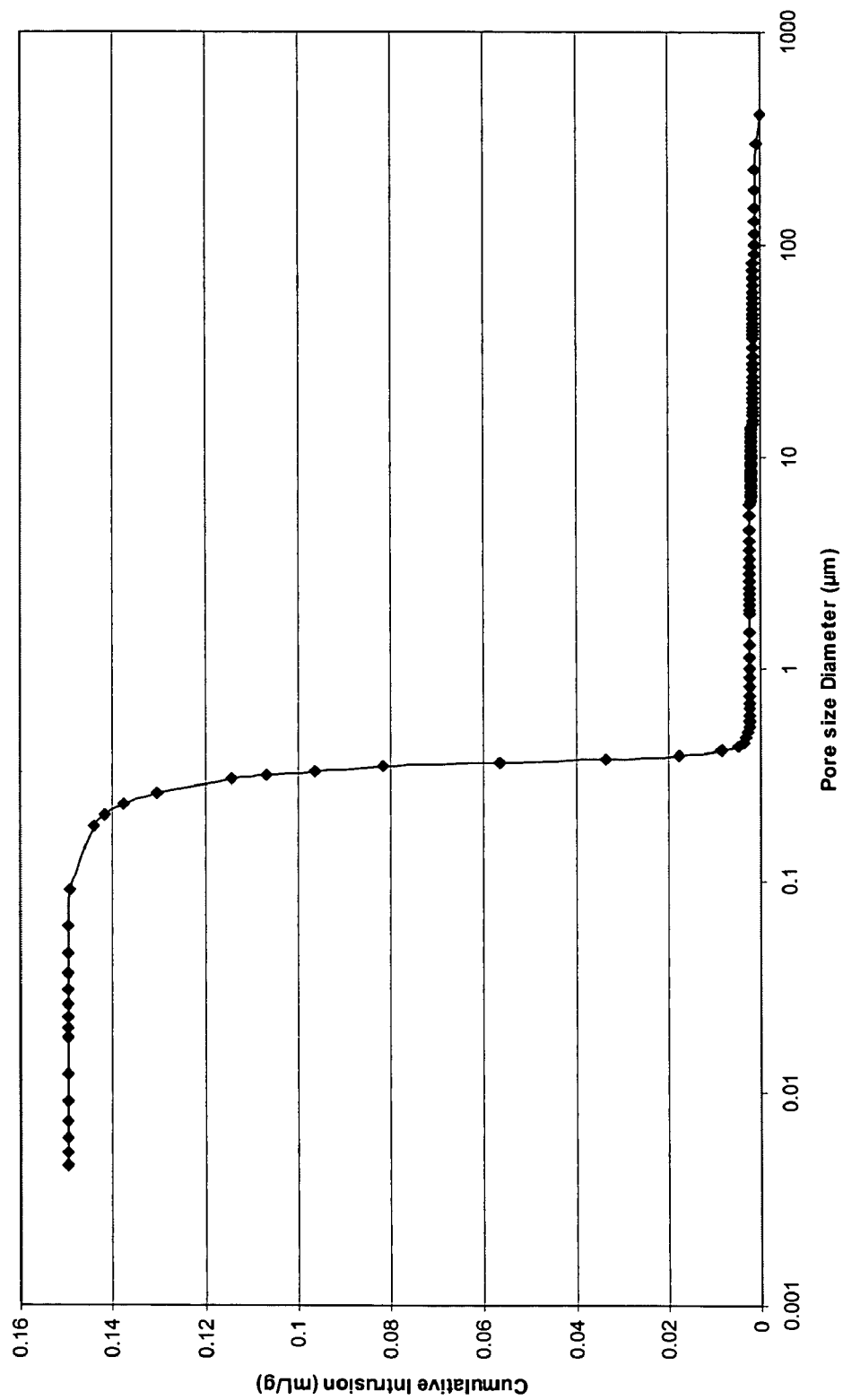

Another example, shown in FIG. 6-A and 6-B, depicts an anode. The anode is formed through the mixing of nickel-oxide, which is milled to 12.5 meters$^2$ per gram, with yttria-stabilized zirconia and carbon black. The carbon black comprises approximately 15.7 wt. % or 40 vol. %. FIG. 6-A depicts the anode after a hot pressing cycle in a reducing atmosphere. FIG. 6-B depicts the anode after burnout or heat treatment in air at 900° C. for 10 hours. The exemplary anode has a 12% open porosity.

FIGS. 7-A, 7-B, 7-C and 7-D further exemplify the pores that result from a burnout process. FIG. 7-A depicts an exemplary anode comprising predominately nickel and yttria-stabilized zirconia after burnout of the pore former. FIG. 7-B depicts the pore distribution resulting from the oxidation of graphite mixed to 23.5 wt. % with the anode constituents. The total resulting porosity is 47%. The total pore area is approximately 0.752 meters$^2$ per gram and the average pore diameter is approximately 0.689 micrometers.

FIG. 7-C depicts a similar anode formed through the oxidation of carbon black. The carbon black is included with the nickel and yttria-stabilized zirconia in approximately 23.5 wt. %. The carbon black was milled to an average of 0.5 microns. FIG. 7-D depicts the pore size distribution after oxidation or burnout. The resulting anode has the porosity of greater than 50%, a total pore area of approximately 1.899 meters$^2$ per gram and an average pore diameter of approximately 0.315 micrometers.

The electrolyte may be formed by several techniques. Please refer to U.S. Ser. No. 10/864,286, filed Jun. 9, 2004, a nonprovisional application of U.S. Ser. No. 60/477,147, filed Jun. 9, 2003, incorporated herein by reference. The thus formed layers including the cathode, electrolyte, and anode may be laminated together using conventional ceramic processing techniques.

Microchannels may be formed in a manner similar to the porosity by including channel former structures such as channel-forming fibers, rods, or meshes. These channel formers may be substantially removed by a subtractive process such as oxidation or burned out to leave microchannels, which permits the transport of fluid through the electrode structure.

An alternate method of integrally forming a cell including microchannels is depicted in FIG. 8, in which microchannels are formed by a non-subtractive process. Here, microchannels are formed by molding-in-place. A solid oxide fuel cell structure including an anode 806, an electrolyte 808, and a cathode 810 may be pressed between two channel-forming molds 802. These molds 802 may include a raised pattern 812, which when pressed into the solid oxide fuel cell 804, form partial channels 814. In one example, the molds 802 may be formed from graphite and may be pressed into the SOFC during a hot pressing cycle. However, in preferred alternative embodiments, the molds 803 may be formed of materials other than graphite. In another alternative, microchannels of a stack may be extruded or cast-in-place. Placing another cell with comparable partial channels over the channel produces a stack with electrode microchannels.

Figure 9:
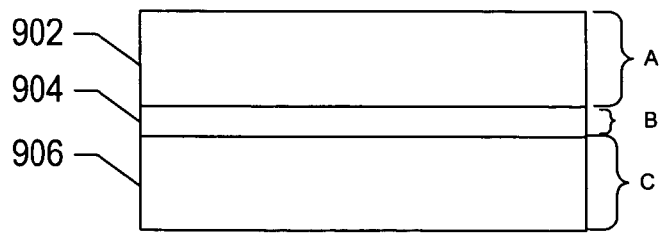
FIG. 9 depicts an exemplary solid oxide fuel cell.

FIG. 9 depicts a single SOFC cell. The single SOFC cell includes an anode 902, an electrolyte 904, and a cathode 906. The anode 902 has a thickness as indicated by "A", the electrolyte 904 has a thickness indicated as "B" and the cathode 906 has a thickness indicated by "C". By integrally treating the cell or a stack of cells with a heat treatment such as hot pressing, hot forging, or hot isostatically pressing, the size of the individual cells may be reduced, and the materials of the cell sintered. The cells or the stack effectively form a cell-supported SOFC or a stack-supported SOFC, as opposed to an electrolyte or electrode-supported cell. The effective anode and cathode layer thickness, "A" or "C," may be reduced to less than about 150 micrometers. The electrolyte thickness "B" may be reduced to less than about 100 micrometers and may be less than about 40 micrometers, less than about 30 micrometers, or less than about 10 micrometers. The monolithic heat treatment of the cells or stacks permits the combined use of a thin electrolyte of less than about 100 micrometers and thin electrodes of less than about 150 micrometers.

Figure 10A:
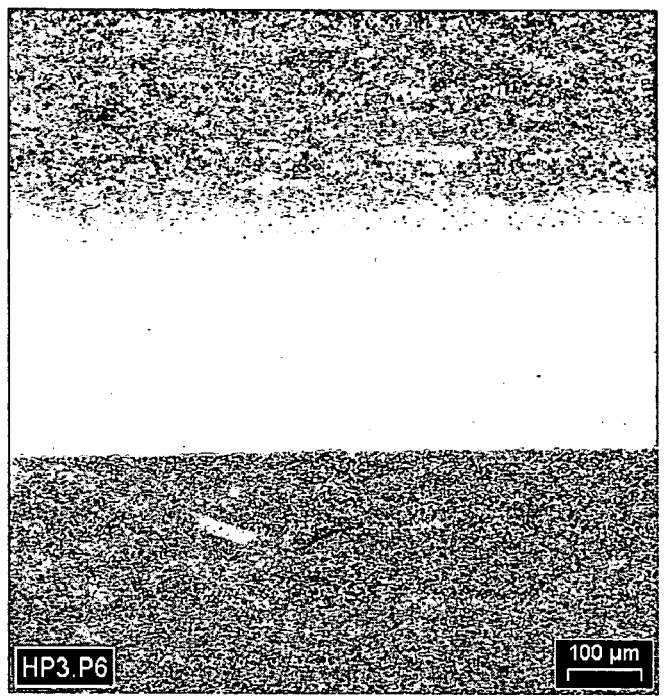
FIGS. 10-A and 10-B depict an exemplary solid oxide fuel cell.
Figure 10B:
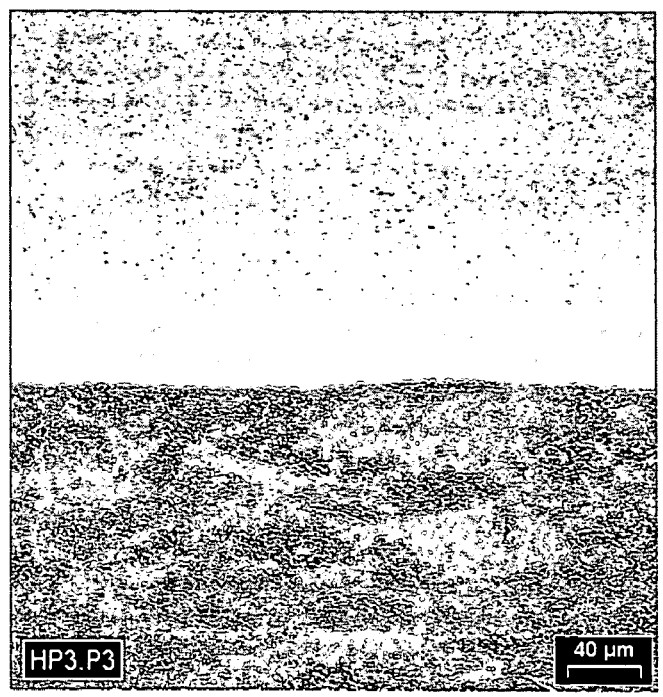

FIG. 10-A depicts a thick electrolyte included in a solid oxide fuel cell (SOFC). The electrolyte is shown to be several-hundred micrometers thick. FIG. 10-B depicts an alternate electrolyte of approximately 40 micrometers.

Figure 11:
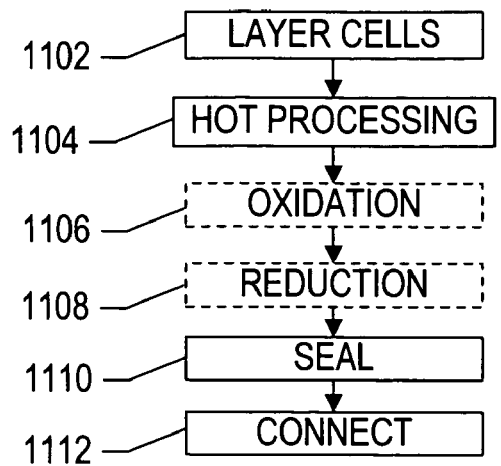
FIGS. 11, 12 and 13 illustrate an exemplary method for forming a solid oxide fuel cell stack.

FIG. 11 depicts an exemplary method for making solid oxide fuel cells and solid oxide fuel cell stacks. The layers of the cells may be formed, as shown in step 1102. The layering methods may take advantage of various low-cost manufacturing approaches including tape-casting, screen-printing, tape-calendaring, thermal spray coating, lithographic deposition, extrusion and coating, and co-extrusion. The cells are heat treated together, as shown at step 1104. The heat treatment may include hot pressing, hot isostatic pressing, or hot forging, among other methods. Steps 1102 and 1104 may be carried out simultaneously in certain co-firing techniques incorporating hot pressing, hot isostatic pressing, or hot forging. Heat treatment may be performed in a reducing atmosphere or, preferably in a non-reducing atmosphere, such as an oxidizing atmosphere. If heat treatment is performed in a reducing atmosphere, a subsequent oxidation step may be performed, as shown at step 1106. The oxidation step may be used to remove channel formers and pore formers. The oxidation may result in the oxidation of some nickel within the anode or nickel within wire mesh in various electrodes. As such, a subsequent reduction step may be performed, as shown at step 1108. However, hot pressing in an oxidation atmosphere may reduce the number of additional oxidation and reduction steps.

The stack may be sealed, as shown at step 1110 and contacts connected, as shown at step 1112. Depending upon the processing method, the order of these steps may be reversed.

Figure 12:
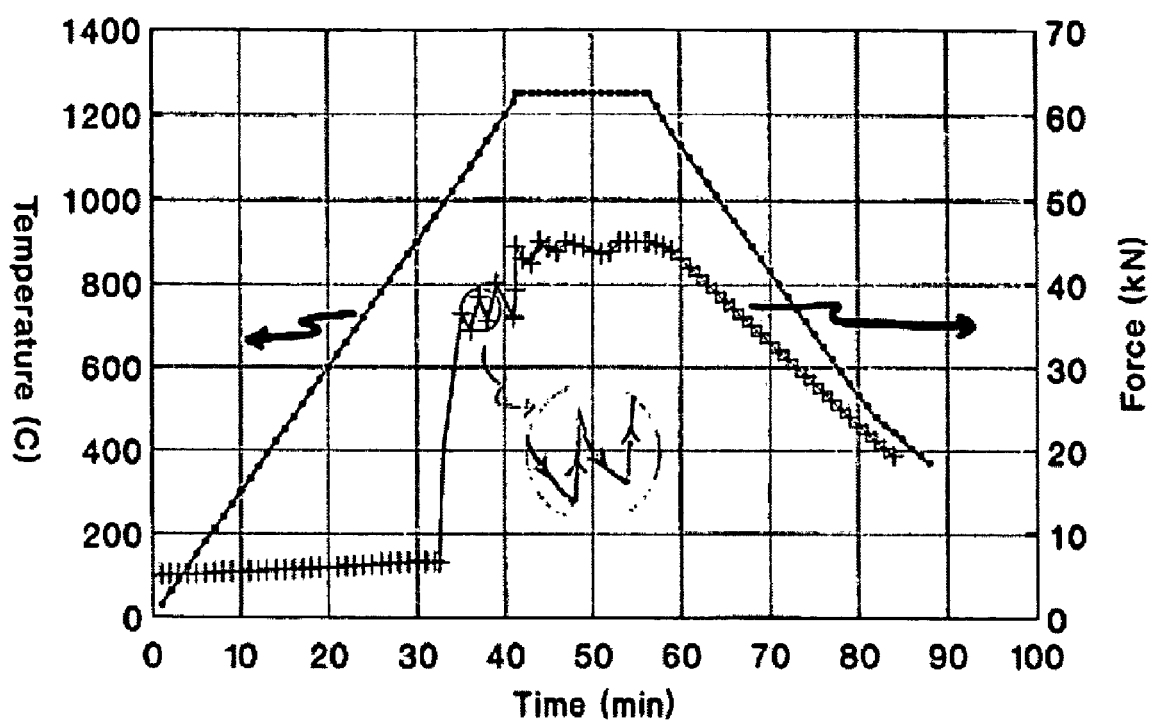

FIG. 12 depicts an exemplary cycle of the hot processing. The shortened processing cycle is shown in which solid oxide fuel cells or a solid oxide fuel cell stack is hot-forged. Once a desired temperature is reached a force may be applied for a period of less than one hour. Such shortened processing cycles would result in a reduced cost and faster production of solid oxide fuel cell stacks. While the forces depicted in FIG. 12 are as high as 47 kN, a preferred range may be between about 0.1 and about 20 kN, such as between about 0.1 and about 10 kN.

Figure 13:
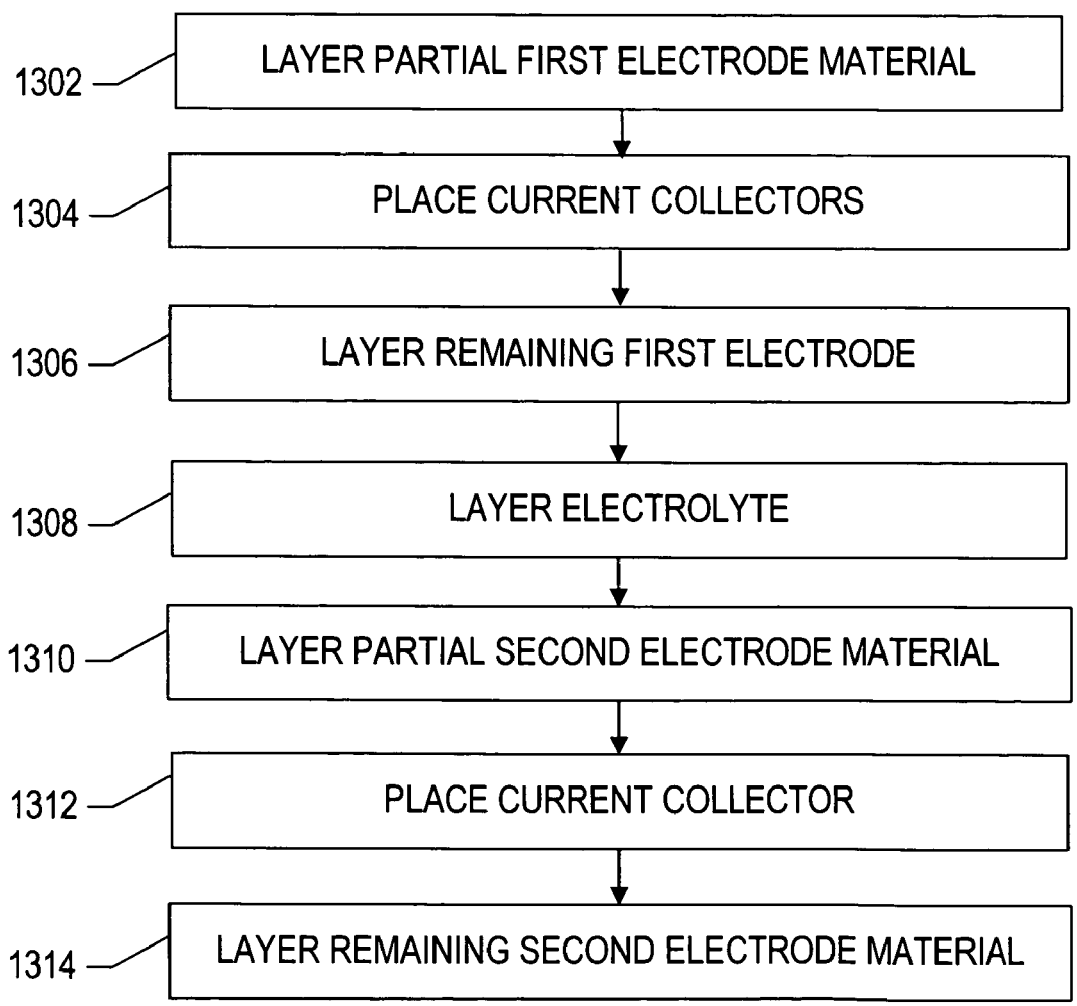

FIG. 13 depicts an exemplary formation of a solid oxide fuel cell. A partial electrode is layered, as shown in step 1302. A current-collector mesh is placed within the partial electrode, as shown at step 1304. In addition, microchannel forming rods may be place on or within the partial electrode. The remaining material to form the first electrode is subsequently layered, as shown at step 1306. Then, an electrolyte is layered, as shown at step 1308. A subsequent layer of a partial second electrode material is placed over the electrolyte layer, as shown at step 1310. A current-collecting mesh is placed over the partial second electrode material, as shown at step 1312. The remaining material forming the second electrode is layered over the current-collector mesh and partial second electrode, as shown at step 1314. In addition to the current-collector, a microchannel-forming mesh may be placed with the partial electrodes. The cell may be pressed or hot-processed separately or together with other cells to form a stack.

Figure 14:
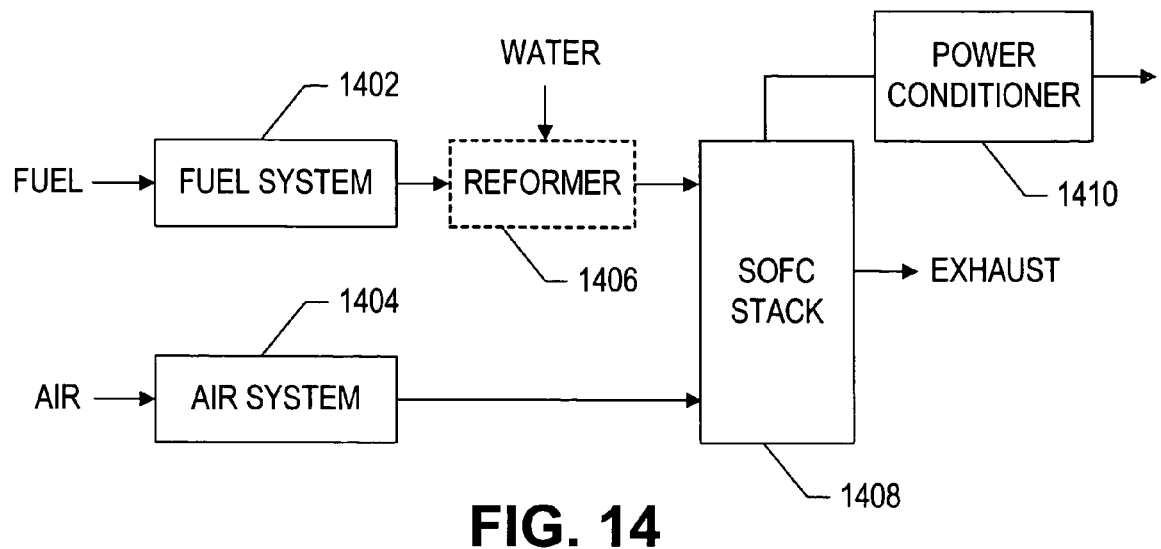
FIG. 14 illustrates an exemplary SOFC system.

The solid oxide fuel cells described above may be incorporated into a SOFC system for producing power. FIG. 14 depicts an exemplary SOFC system. The system includes a fuel system 1402, an air system 1404, a SOFC stack 1408, and a power conditioner 1410. The system may also include a reformer 1406 depending on the expected operating temperature of the SOFC stack.

Fuel enters the fuel system 1402. The fuel system 1402 may clean the fuel and/or heat the fuel in preparation for reforming or reaction. The fuel system 1402 may include heat exchangers, compressors, pumps, absorption beds, and other components. From the fuel system 1402, the fuel enters a reformer 1406. The reformer 1406 may use the fuel to produce hydrogen and other molecules. The reformer 1406 is typically used for low temperature SOFC systems. High temperature SOFC systems may have the advantage of internal reforming and thus utilize unreformed fuel.

Air enters the air system 1404. The air system 1404 may clean, compress, purify, and/or heat the air. The air system may include compressors, absorption beds, membranes, and heat exchangers, among other components.

The fuel and air are directed to the SOFC stack 1408. The fuel is typically directed across the anodes of the fuel cells in the SOFC stack and the air is typically directed across the cathodes. In the case of SOFCs, oxygen transport across the electrolyte from the cathode to the anode produces an electric potential. This electric potential is conditioned with a power conditioner 1410 that is electrically coupled to the SOFC stack 1408. The power conditioner 1410 may deliver power to a grid or circuitry. Exhaust from the SOFC stack may be used for heat exchange or in the reformation process.

FIG. 15 depicts an exemplary solid oxide fuel cell stack with electrodes comprising microchannels following a hot pressing cycle under an air atmosphere. In this exemplary embodiment, the microchannels were formed by the oxidation of graphite-resin composite rods during the hot pressing cycle. The rods were embedded in the electrode bodies in a manner analogous to the process described in FIG. 13, in which steps 1304 and 1312 represent the placement of the microchannel formers. The solid oxide fuel cell stack was hot pressed at 1300° C. under 1 MPa pressing pressure. In alternative embodiments, the solid oxide fuel cell stack may be hot pressed under pressures ranging from about 0.01 MPa to about 100 MPa, such as between about 0.1 MPa and about 50 MPa or between about 0.5 MPa and about 20 MPa.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An integrated solid oxide fuel cell stack comprising:
   a first anode layer;
   a first electrolyte layer overlying the first anode layer;
   a first cathode layer overlying the first electrolyte layer;
   a second electrolyte layer overlying the first cathode layer; and
   a second anode layer overlying the second electrolyte layer, wherein:
   the first and second electrolyte layers are in direct contact with the first cathode layer and the first cathode layer consists of a unitary layer; and
   a metal mesh is embedded in the first anode layer, the first cathode layer, the second anode layer, or any combination thereof.

2. The solid oxide fuel cell stack of claim 1, further comprising:
   a third electrolyte layer overlying the second anode layer; and
   a second cathode layer overlying the third electrolyte layer, wherein the second and third electrolyte layers are in direct contact with the second anode layer.

3. The solid oxide fuel cell stack of claim 1, further comprising:
channels in the first cathode layer.

4. The solid oxide fuel cell stack of claim 1, wherein the first cathode layer comprises a composition from the group consisting of lanthanum strontium manganite, lanthanum strontium ferrite, and lanthanum strontium cobalt ferrite.

5. The solid oxide fuel cell stack of claim 1, wherein the first cathode layer comprises lanthanum strontium manganite.

6. The solid oxide fuel cell stack of claim 1, wherein the first cathode layer consists of a single composition forming the unitary layer.

7. An integrated solid oxide fuel cell stack comprising:
a first anode layer;
a first electrolyte layer overlying the first anode layer;
a first cathode layer overlying the first electrolyte layer, the first cathode layer having top and bottom surfaces and a mass of electrically conductive material extending continuously between the top and bottom surfaces, the bottom surface contacting the first electrolyte layer, and the first cathode layer having open porosity;
a second electrolyte layer overlying the first cathode layer such that the top surface of the first cathode layer is in direct contact with the second electrolyte layer; and
a second anode layer overlying the second electrolyte layer, wherein
a metal mesh is embedded in the first anode layer, the first cathode layer, the second anode layer, or any combination thereof.

8. The solid oxide fuel cell stack of claim 7, wherein the first cathode layer comprises a composition from the group consisting of lanthanum strontium manganite, lanthanum strontium ferrite, and lanthanum strontium cobalt ferrite.

9. The solid oxide fuel cell stack of claim 7, wherein the first cathode layer consists of a single composition forming the mass of electrically conductive material.

* * * * *